US006860236B2

(12) United States Patent
Wood (10) Patent No.: US 6,860,236 B2
(45) Date of Patent: Mar. 1, 2005

(54) METHOD FOR PROCESSING AND RECYCLING ANIMAL WASTE AND METHOD FOR DOING BUSINESS USING THE SAME

(76) Inventor: James L. Wood, 17878 Raven Rd., Granby, MO (US) 64844

( * ) Notice: Subject to any disclaimer, the term of this patent is extended or adjusted under 35 U.S.C. 154(b) by 0 days.

(21) Appl. No.: 10/774,217

(22) Filed: Feb. 6, 2004

(65) Prior Publication Data

US 2004/0168651 A1 Sep. 2, 2004

Related U.S. Application Data

(63) Continuation of application No. 10/199,624, filed on Jul. 19, 2002, now abandoned.

(51) Int. Cl.[7] .......................... A01K 31/04; A01K 29/00
(52) U.S. Cl. ...................... 119/442; 119/161
(58) Field of Search ................................ 119/442, 443, 119/447, 450, 479, 171, 28.5, 161

(56) References Cited

U.S. PATENT DOCUMENTS

| 4,708,294 A | 11/1987 | Endom |
| 5,195,465 A | 3/1993 | Webb et al. |
| 6,405,677 B2 | 6/2002 | McPherson et al. |

FOREIGN PATENT DOCUMENTS

| EP | 948889 A1 | 10/1999 |
| NL | 1005897 C6 | 10/1998 |

OTHER PUBLICATIONS

Tadtiyanant et al., "Extrusion Processing Used to Convert Dead Poultry, Feathers, Eggshells, Hatchery Waste, and Mechanically Deboned Residue into Feedstuffs for Poultry", 1993 Poultry Science 72, p. 1515–1527 (1993).

Haque et al., "Extrusion Processing of Broiler Starter Diets Containing Ground Whole Hens, Poultry By–Product Meal, Feather Meal, or Ground Feathers", 1991 Poultry Science 70, p. 234–240 (1991).

"The Dry Extrusion Process", Insta–Pro International brochure.

"Insta–Pro Model 2500 Extruder", Insta–Pro International brochure.

"Insta–Pro Model 9800 Extruder", Insta–Pro International brochure.

Said et al., "Extrusion Processing of Ingredients and Feed", Insta–Pro International brochure (1995).

"Microbiologic Evaluation of Dead Bird Meal", Insta–Pro International brochure.

Froning et al., "Utilization of Inedible Eggshells and Technical Egg White Using Extrusion Technology", Insta–Pro International brochure (1989).

(List continued on next page.)

Primary Examiner—Son T. Nguyen
(74) Attorney, Agent, or Firm—Shook, Hardy and Bacon, L.L.P.

(57) ABSTRACT

A method for processing animal waste reduces ammonia levels and moisture and eliminates darkling beetles by heating and compressing the animal waste (such as soiled litter). In the preferred embodiments, the heating and compressing are done simultaneously using a screw-type extruder that is commercially available, but has only been used to date for producing animal food and feed products. By heating and compressing the animal waste, the volume of waste is reduced, bacteria in the waste is destroyed, and all darkling beetles in the waste are killed. In addition, the resulting processed waste may be recycled because it is free of bacteria and in a dry form. The preferred embodiments also include methods for doing business that include the processing of animal waste.

9 Claims, 6 Drawing Sheets

OTHER PUBLICATIONS

Tadtiyanant et al., "Extrusion Processing Used to Convert Egg Shells, Hatchery Waste and Deboning Residuals into Feedstuffs for Laying Hens", Insta–Pro International brochure (1991).

Blake et al., "Extruding Poultry Farm Mortalities", Insta–Pro International brochure (1991).

Patterson et al., "Feeding Value of Poultry By Product Coextruded with Cassava, Barley and Wheat Middlings for Broiler Chicks: The Effect of Ensiling Poultry By–Products as a Preservation Method Prior to Coextrusion", Insta–Pro International brochure.

Tadtiyanant et al., "Utilization of Extruded Poultry Mortalities and Feathers in Broiler Starter Diets", Insta–Pro International brochure.

Haque et al., "Utilization of Ground Whole Hens in Broiler Diets", Insta–Pro International brochure (1987).

Blake et al., "Dry Extrusion of Offal, Feathers, and Dead Birds", Insta–Pro International brochure.

Murphy et al., "Preservation of and Nutrient Recover from Poultry Carcasses Subjected to Lactic Acid Bacteria Fermentation". Insta–Pro International brochure (1992).

"Feed from Poultry Waste—A New Process", Insta–Pro International brochure.

Said, "Dry Extrusion—A Solution t Wet Waste Problems", Insta–Pro International brochure.

Web page, www.insta–pro.com/waste.htm "Inta–Pro Extrusion Recycling Systems for By–Products" (Dec. 4, 2002).

UCDAVIS, "How much can they take?", http://www.vetmed.ucdavis.edu/vetext/INF–PO_Forum/howmuch.html (Jul. 14, 2002).

Agrirecycle, "what Does AgriRecycle Offer?", http://www.agrirecycle.com/agrirecycleoffers.htm (Jul. 14, 2002).

Agrirecycle, "Environmental Benefits of an AgriRecycle Manure Plant", http://www.agrirecycle.com/environmentalbenefits.htm (Jul. 14, 2002).

Agrirecycle home page, http://www.agrirecycle.com/frontpage.htm (Jul. 14, 2002).

Agrirecycle, "Let AgriRecycle Turn Your Poultry Litter into a Usable Fertilizer!", http://www.agrirecycle.com/agribenefits.htm (Jul. 14, 2002).

Agrirecycle photo gallery, http://www.agrirecycle.com/photogallery.htm (Jul. 14, 2002).

Carper Kicks Off Opening of Perdue AgriRecycle Plant, http://carper.senate.gov/—carferfress/01/07/2001718532.html (Jul. 14, 2002).

METHOD FOR PROCESSING AND RECYCLING ANIMAL WASTE AND METHOD FOR DOING BUSINESS USING THE SAME

This application is a continuation of application Ser. No. 10/199,624, filed Jul. 19, 2002 now abandoned and entitled "Method For Processing and Recycling Animal Waste and Method for Doing Business Using the Same".

BACKGROUND OF THE INVENTION

1. Technical Field

This invention generally relates to the field of animal husbandry, and more specifically relates to methods for processing animal waste and methods for doing business using the methods for processing animal waste.

2. Background Art

Commercial poultry operations provide the majority of poultry consumed in the United States. In most turkey and chicken operations, large buildings are used to house the birds as they grow to the desired weight. One aspect of using these buildings is the need to dispose of the excrement (or droppings) produced by the birds. Typically, clean litter is placed on the floor of a poultry house before chicks are delivered. Examples of known litter materials include organic materials such as sawdust, wood chips, and rice hulls, inorganic materials such as sand, and processed materials such as shredded newspaper. The birds leave their droppings on the litter. The litter absorbs most of the liquid content of the poultry waste, and adheres to the solids. Once the birds are removed from the poultry house, the clumped or caked portion of the soiled litter is typically removed from the poultry house and spread on farm land as a fertilizer. The rest of the soiled litter is typically left in the poultry house for the next flock.

While the birds grow, the bacteria and moisture in the droppings that is captured in the litter creates ammonia. Ammonia is a problem because excessive levels of ammonia may cause blindness in young chicks, may stunt their growth, and may decrease their resistance to disease.

After removing the caked portion of litter after a flock is removed from the poultry house, the remaining litter is typically tilled several times, and the poultry house is then heated until the ammonia and moisture content of the poultry house drops to acceptable levels. This can take several days, with typical times of two weeks to air out a poultry house between flocks. Leaving poultry houses empty for two weeks or more at a time reduces the number of flocks a poultry farmer can raise due to the time that the poultry houses must sit empty to reduce the buildup of ammonia. In addition, high ammonia levels in poultry houses generate an unpleasant smell that is often complained of by neighbors.

Another problem with current poultry operations is the presence of darkling beetles in the litter. These beetles carry bacteria that can spread disease to the flock. Darkling beetles reside in the soiled litter in the poultry house, increasing the risk of spreading disease to the new flock because the beetle population is usually left unchecked.

Without a way to reduce the turnaround time for poultry houses, and for better addressing the problems of bacteria, moisture, ammonia, darkling beetles, and other pests, the poultry industry will continue to suffer undue losses associated with the drawbacks in the prior art discussed above.

DISCLOSURE OF INVENTION

According to the preferred embodiments, a method for processing animal waste reduces ammonia levels and moisture and eliminates darkling beetles by heating and compressing the animal waste (such as soiled litter). In the preferred embodiments, the heating and compressing are done simultaneously using a screw-type extruder that is commercially available, but has only been used to date for producing animal food and feed products. By heating and compressing the animal waste, the volume of waste is reduced, bacteria in the waste is destroyed, and all darkling beetles in the waste are killed. In addition, the resulting processed waste may be recycled because it is free of bacteria and in a dry form. The preferred embodiments also include methods for doing business that include the processing of animal waste.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments disclose methods for processing animal waste, and methods for doing business that include the processing of animal waste or the use of recycled animal waste that has been processed. The specific examples provided herein relate to poultry farming, but one skilled in the art will recognize that the methods herein are not limited to poultry applications.

Figure 1:
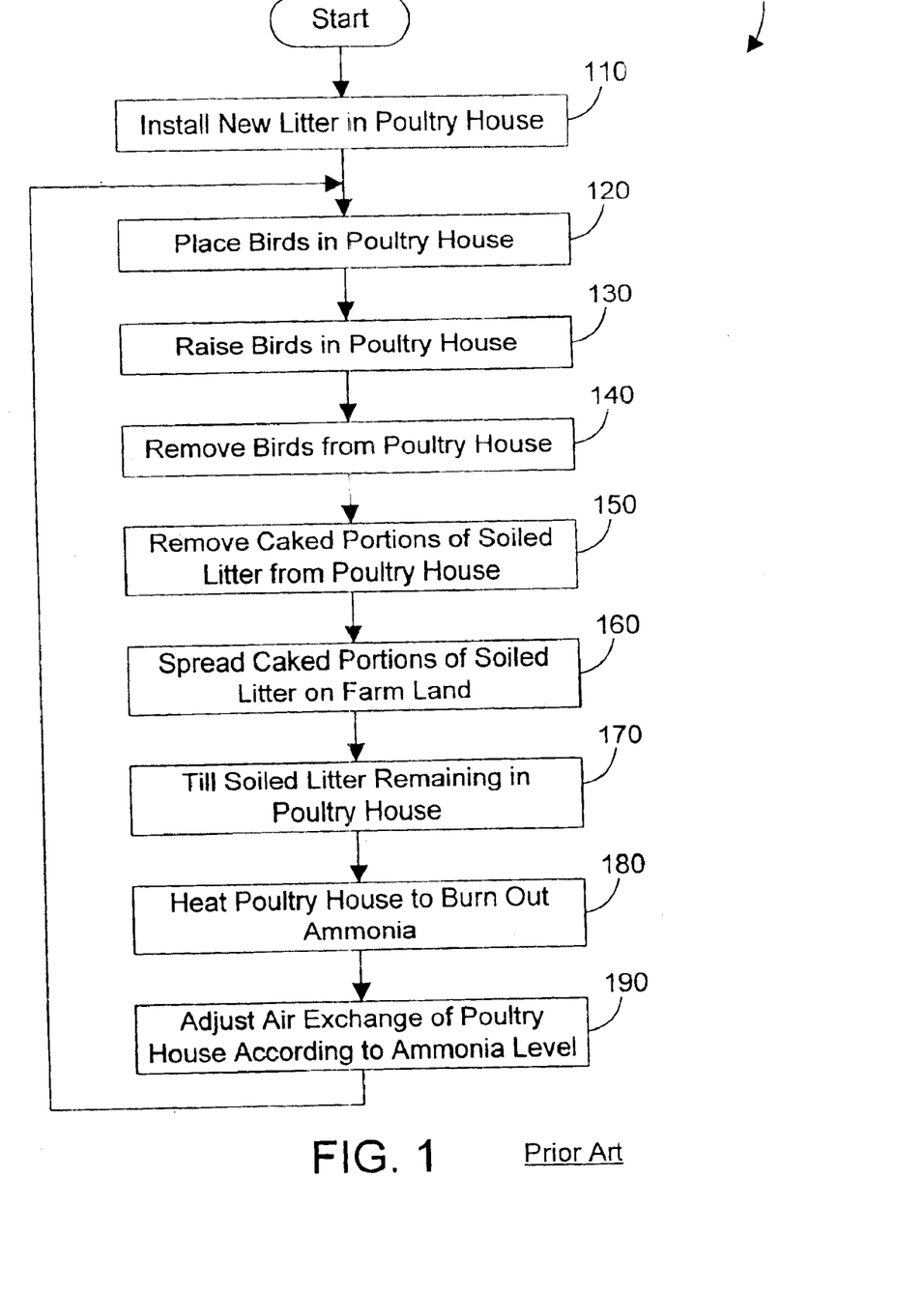
FIG. 1 is a flow diagram of a prior art method for operating a commercial poultry farm.

Referring now to FIG. 1, a prior art method 100 for raising birds in poultry houses begins by installing new litter in a poultry house (step 110). The term "litter" is used herein in its broadest possible sense, and expressly includes organic materials such as sawdust, wood chips, and rice hulls, inorganic materials such as sand, processed materials such as shredded newspaper, and any other material that causes animal excrement to form clumps, whether naturally-occurring, processed, or synthetic. We assume that step 110 is performed after a poultry house is constructed, or after an annual clean-out of the poultry house. Once litter is in place, birds are placed in the poultry house (step 120). The birds are then raised in the poultry house (step 130). The time required to raise the birds depends on the type of bird and desired weight of the birds. While the birds are being raised in step 130, they defecate (leave their droppings) on the litter. Once the birds are to the desired age or weight, they are removed from the poultry house (step 140). The birds are then typically trucked to a plant for processing.

With the birds removed from the poultry house, the poultry house must then be prepared for the next flock. A decaking machine is typically used to remove caked portions of the soiled litter from the poultry house (step 150). The removed caked portions are then spread on farm land (step 160). The litter remaining in the poultry house is tilled (step 170), and may be tilled a number of different times. Tilling the soiled litter allows it to air out, releasing the ammonia that builds up in the poultry house. To help to burn out the ammonia, the poultry house is typically heated (step 180). The amount of air exchange in the poultry house is adjusted by the farmer to get rid of the unwanted ammonia, and to keep the ammonia levels in the poultry house to acceptable levels (step 190). Method 100 then loops back to step 120, and the process is repeated for the next flock of birds.

The prior art method 100 described above suffers from several significant problems. First of all, the soiled litter removed from the poultry house must be disposed of. The most common way to dispose of the soiled litter is to spread the litter on farm land, as shown in step 160. Note, however, that soiled poultry litter is high in phosphates and nitrogen, which are considered as pollutants in excessive levels. As a result, the caked portions of the soiled litter cannot be spread just anywhere. In the future, land owners will likely have to meet Environmental Protection Agency (EPA) requirements before spreading litter, which involves soil testing prior to land application. Once the phosphate levels of nearby land exceed certain levels, the poultry farmer will face the cost of finding other land that is farther away to dispose of the soiled litter, which is not only a hassle but will also cost the farmer more to truck the soiled litter further distances.

Another significant problem with method 100 is that the decaked portions of the soiled litter (the litter that remains after the caked portions are removed) are reused for the next flock. Bacteria in the droppings multiply quickly in the litter, and generate ammonia. Ammonia in excessive levels can cause blindness in birds, and can contribute to the mortality rate of birds. For this reason, steps 170, 180 and 190 in method 100 of FIG. 1 are performed to manage the problem of ammonia buildup.

As the poultry house is heated in step 180, the ammonia is released from the remaining soiled litter. However, the increased heat also increases the rate at which the ammonia-generating bacteria multiply. However, experience has shown that the ammonia is driven off faster than the increased bacteria can generate it. The result is a net decrease in ammonia levels, with the undesirable side effect of a net increase of ammonia-generating bacteria. The result is that ammonia levels become more and more difficult to maintain below desired levels with each additional flock.

In most poultry operations, step 180 of heating the poultry house to burn out the ammonia typically takes one or two days prior to placing a new flock in the poultry house. In cold weather, heating the poultry houses for one or two days when they do not contain birds is expensive. Even more significant is the down time that reduces the number of flocks that can be raised by a poultry farmer in a given year.

Even after new chicks are placed in the poultry house in step 120, the rate of air exchange is adjusted by the poultry farmer in an effort to maintain the level of ammonia below a harmful level. As the chicks mature, they can withstand greater levels of ammonia, so the air exchange rate may be reduced to accommodate the more mature birds.

Another problem that arises from reusing untreated soiled litter is insect infestation. In particular, darkling beetles are common insects found in poultry houses. These beetles carry bacteria and disease. It is common to treat a poultry house for beetles and other insects during an annual clean-out when all of the soiled litter is removed and replace with new litter. In between flocks, however, when soiled litter is kept in the poultry house, treatment for beetles is rarely performed. As a result, the number of darkling beetles and other insects can increase dramatically as soiled litter is reused, thereby increasing the risk of health problems and disease in the birds.

Figure 2:
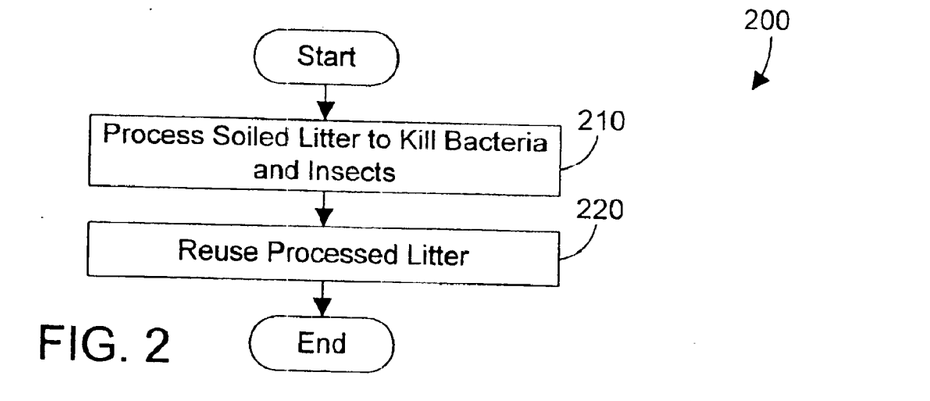
FIG. 2 is a flow diagram of a method in accordance with the preferred embodiments for processing soiled litter and reusing the processed litter in accordance with the preferred embodiments.

The preferred embodiments recognize that there are significant problems with the prior art, and addresses a number of these problems by processing and reusing soiled litter. Referring to FIG. 2, method 200 in accordance with the preferred embodiments includes the steps of processing the soiled litter to kill bacteria and insects (step 210), and reusing the processed litter (step 220). By processing the soiled litter to kill bacteria and insects, the litter is effectively "sanitized". As a result, the problem of disposing of the litter by spreading on farm land is significantly reduced, because the soiled litter can be reused without disposing of it. In addition, the problems with ammonia buildup and insect infestation are minimized because the process in step 210 burns off the ammonia that is present, kills the bacteria that generates ammonia, and kills all darkling beetles, other insects, larvae, and eggs in the litter. As a result, the processed litter that is reused in step 220 is actually more sanitary than new litter, which is typically clean, but may contain bacteria and/or insects and/or other contaminants.

The temperature required to kill bacteria and insects may vary according to the type of bacteria and insects present in the animal waste. It is believed that temperatures of 132° C. to 160° C. will kill bacteria and insects that are a concern in poultry applications. For this reason, the minimum temperature when heating the soiled litter for the preferred embodiments is suitably 132° C., preferably 145° C., and most preferably 160° C.

Figure 3:
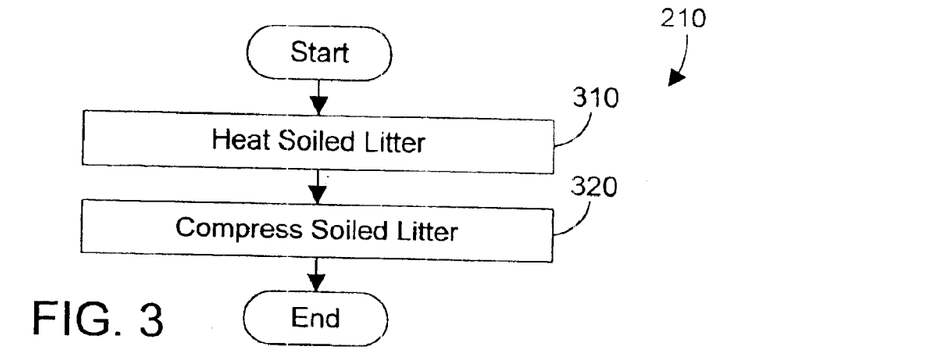
FIG. 3 is a flow diagram of specific steps that may be performed in step 210 of FIG. 2 in accordance with the preferred embodiments.

Referring to FIG. 3, one suitable way to process the soiled litter in step 210 of FIG. 2 includes the steps of heating the soiled litter (step 310) and compressing the soiled litter (step 320). The heating of the soiled litter in step 310 reduces the moisture content of the litter, driving off the ammonia in the soiled litter. In addition, the heating in step 310 also kills bacteria, darkling beetles, and other pests that may be present in the soiled litter. Compressing the soiled litter in step 320 reduces its volume, thereby compacting the litter.

Figure 4:
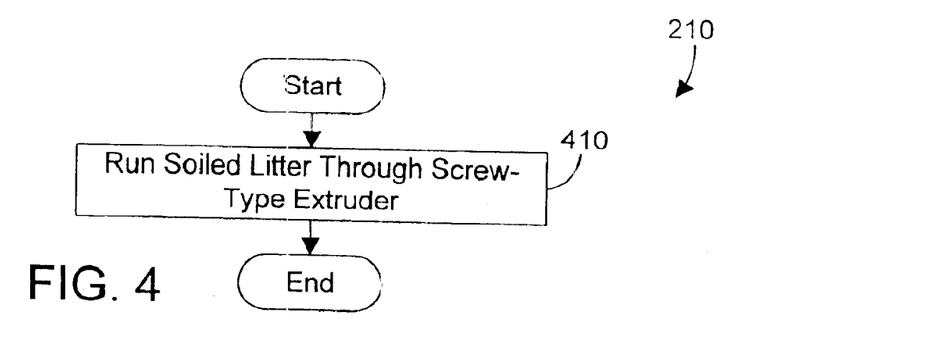
FIG. 4 is a flow diagram of a specific step that may be performed in step 210 of FIG. 2 in accordance with the preferred embodiments.

Referring to FIG. 4, the heating and compressing of the soiled litter in FIG. 3 may be accomplished simultaneously by running the soiled litter through a screw-type extruder (step 410). Screw-type extruders are known in animal husbandry for producing food and feed products. Examples of suitable screw-type extruders are dry extruders manufactured and marketed by Insta-Pro International, 10104 Douglas Avenue, Des Moines, Iowa 50322. Two different Insta-Pro extruders that could be used to process the soiled litter in accordance with the preferred embodiments include the model 2500 extruder and the model 9800 extruder. Of course, other screw-type extruders from Insta-Pro or from other manufacturers could be used within the scope of the preferred embodiments.

The term "screw-type extruder" is used herein to include any apparatus with an auger (screw) that has blades that decrease in distance apart along the direction of travel for the product being processed. In the art of processing food and feed, these extruders are known as dry extruders that are capable of cooking, sterilizing, and dehydrating a wide range of food and feed products. A screw-type extruder typically has no source of heat. The product being processed is heated by friction. As the product passes down the length of the auger, it is compressed by the auger blades that are increasingly close together. This creates both pressure and heat. The resulting product is cooked, sterilized, and dried by running the product through the extruder. Screw-type extruders have been used in the food and feed field to generate high-quality food products and animal feed. Of course, it is within the scope of the preferred embodiments to also include a source of heat to a screw-type extruder to increase the amount of moisture that could be removed or to increase the rate of feeding product through the extruder.

In the prior art, screw-type extruders have been used exclusively for processing food and animal feed. Research has been performed that shows that a screw-type extruder may be used to process dead birds and feathers into components for animal feed. Note, however, that all of the literature for screw-type extruders and all of the research performed to date are for processing food or feed products. Nowhere is there any teaching in the art of processing soiled litter or other animal waste using a screw-type extruder.

Figure 5:
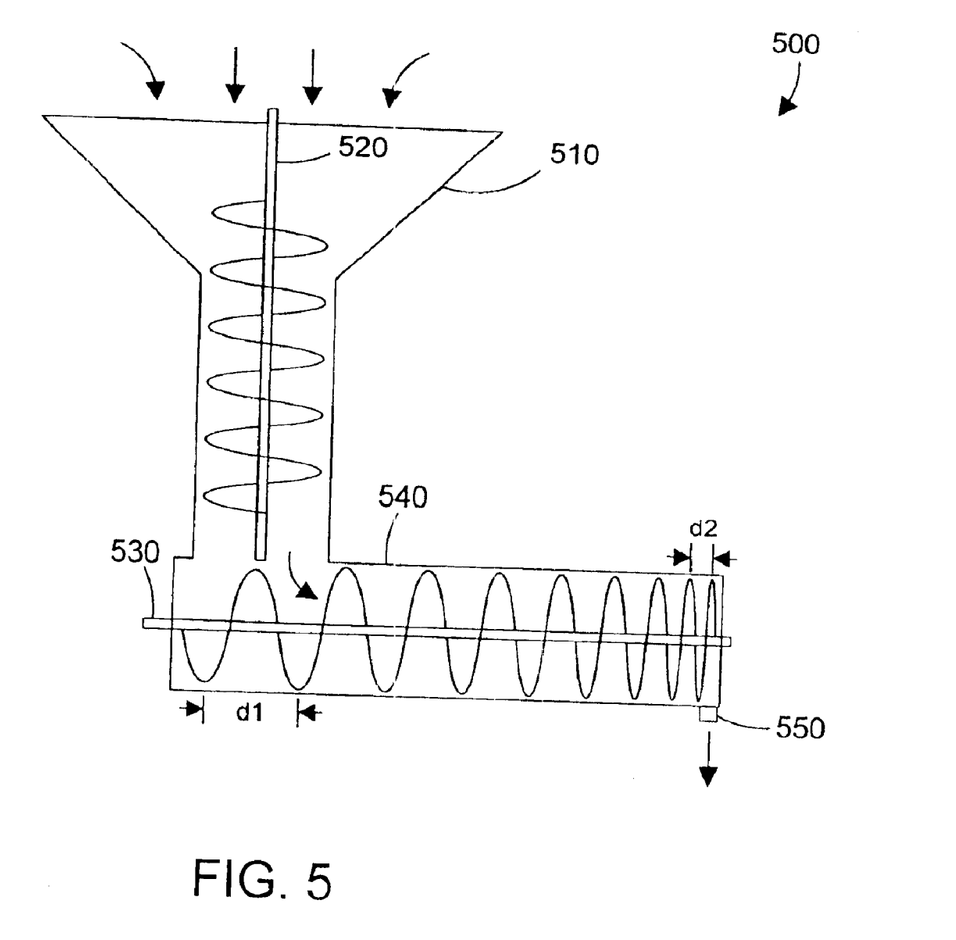
FIG. 5 is a cross-sectional view of a screw-type extruder that may be used to process the soiled litter in accordance with the preferred embodiments.

The function of a screw-type extruder 500 is represented graphically in FIG. 5. Product is initially introduced into a hopper 510. A first auger 520 rotates, which moves product being processed from the hopper 510 to a second auger 530. Auger 530 rotates, thereby pushing the product being processed into a constricted area 540, where the product is trapped between the blades of the auger. Note that auger 530 has blades that are increasingly closer together along the path of travel of the product. For example, as shown in FIG. 1, the auger blades at the front of auger 530 are a distance d1 apart, while the blades at the end of auger 530 are a distance d2 apart that is much smaller than d1. As the product passes down the constricted area 540, it is compressed by the decreasing distance between auger blades, and is heated by friction with the walls of constricted area 540 and by friction with the auger blades. The result is that the product may be "cooked" in a very short time, because the heat and pressure combine to remove moisture and reduce the volume of the product being processed as the product travels through extruder 500. At the end of constricted area 540 is a discharge port 550 where the finished product comes out of the extruder.

The sales literature of Insta-Pro International states that an Insta-Pro dry extruder typically takes less than 30 seconds to cook and dehydrate the product, and the resulting heat of 140° C. to 160° C. sterilized the product. In addition, as screw-type extruder is a continuous-feed machine, allowing unprocessed material to be placed in the hopper as the machine discharges processed product out the discharge port. For this reason, a screw-type extruder may be efficiently used to process animal waste as taught herein.

The Insta-Pro International sales literature also states that the moisture content of the product needs to be in the range of 20–26% (possibly up to 30%). If the animal waste to be processed has an excessively higher moisture content, it may be mixed with a dry ingredient (such as clean litter) to reduce the moisture content to a suitable level. If the animal waste to be processed has an excessively low moisture content, water or other forms of moisture may be added as needed.

One significant advantage to processing the soiled litter using a screw-type extruder is that the litter leaving the extruder is hot. As a result, the warm litter may be spread on the floor of a poultry house after extruding, which will help to heat the poultry house for the next flock. This will result in energy savings to the poultry farmer by requiring less energy to heat the poultry house in preparation for a flock.

Figure 6:
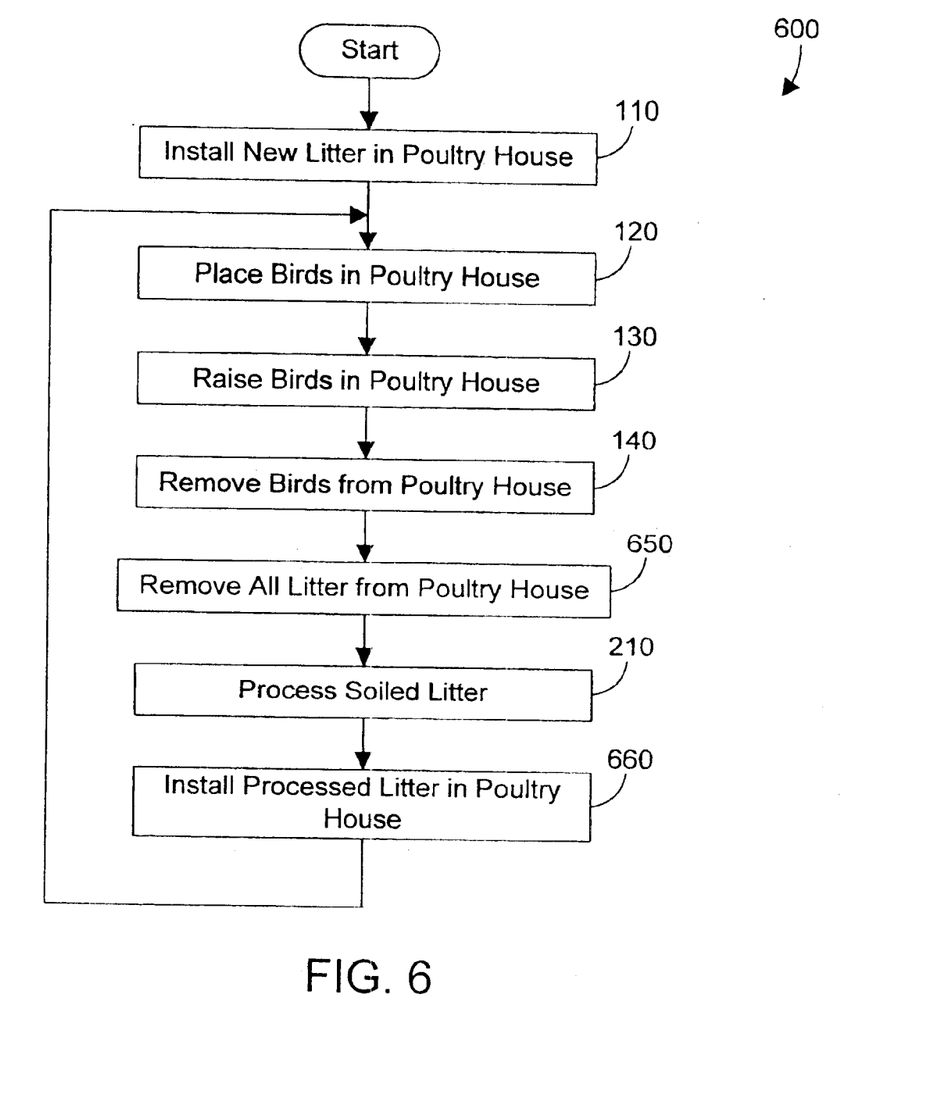
FIG. 6 is a flow diagram of a method in accordance with the preferred embodiments for operating a commercial poultry farm.

The processing of soiled litter in accordance with the preferred embodiments gives rise to a new method 600 for raising poultry, as shown in FIG. 6. Steps 110, 120, 130 and 140 are identical to the steps of the same number in the prior art method, shown in FIG. 1. After the birds are removed from the poultry house (step 140), substantially all of the litter is removed from the poultry house (step 650). This is a significant difference when compared to the prior art, where only the caked portions of the litter are removed in step 150 of FIG. 1. Once substantially all of the litter is removed from the poultry house in step 650, the soiled litter is processed (step 210). Note that examples of processing within the scope of the preferred embodiments are shown in FIGS. 3 and 4 as discussed above. Processing the soiled litter in step 210 sanitizes the litter by killing the bacteria and insects present in the soiled litter, and by burning off the ammonia. Because the processed litter is sanitized, it can then be reused by installing the processed litter into the poultry house for the next flock (step 660).

One significant advantage of method 600 when compared with the prior art is that most of the "down time" for poultry houses to reduce ammonia levels is eliminated. By removing the soiled litter, sanitizing the soiled litter, and returning the sanitized litter to the poultry house for the next flock of birds, the ammonia, ammonia-producing bacteria, and insects (including darkling beetles) are eliminated in the litter. As a result, the one to two week down time for tilling litter (step 170) and heating the poultry house to burn out ammonia (step 180) is reduced to only a day or two. This reduced turn-around time between flocks can significantly increase the throughput (or productivity) of a poultry farm, and may thereby significantly enhance profits for the poultry farmer. In addition, the reduction of ammonia results in less required air exchange in the poultry house, providing considerable savings in energy costs. The combination of decreased turnaround time between flocks, reduced litter disposal requirements, no need to heat the poultry house to burn off ammonia, and the reduced air exchange requirements make the methods of doing business in accordance with the preferred embodiments significantly more profitable than the prior art method 100 shown in FIG. 1.

Figure 7:
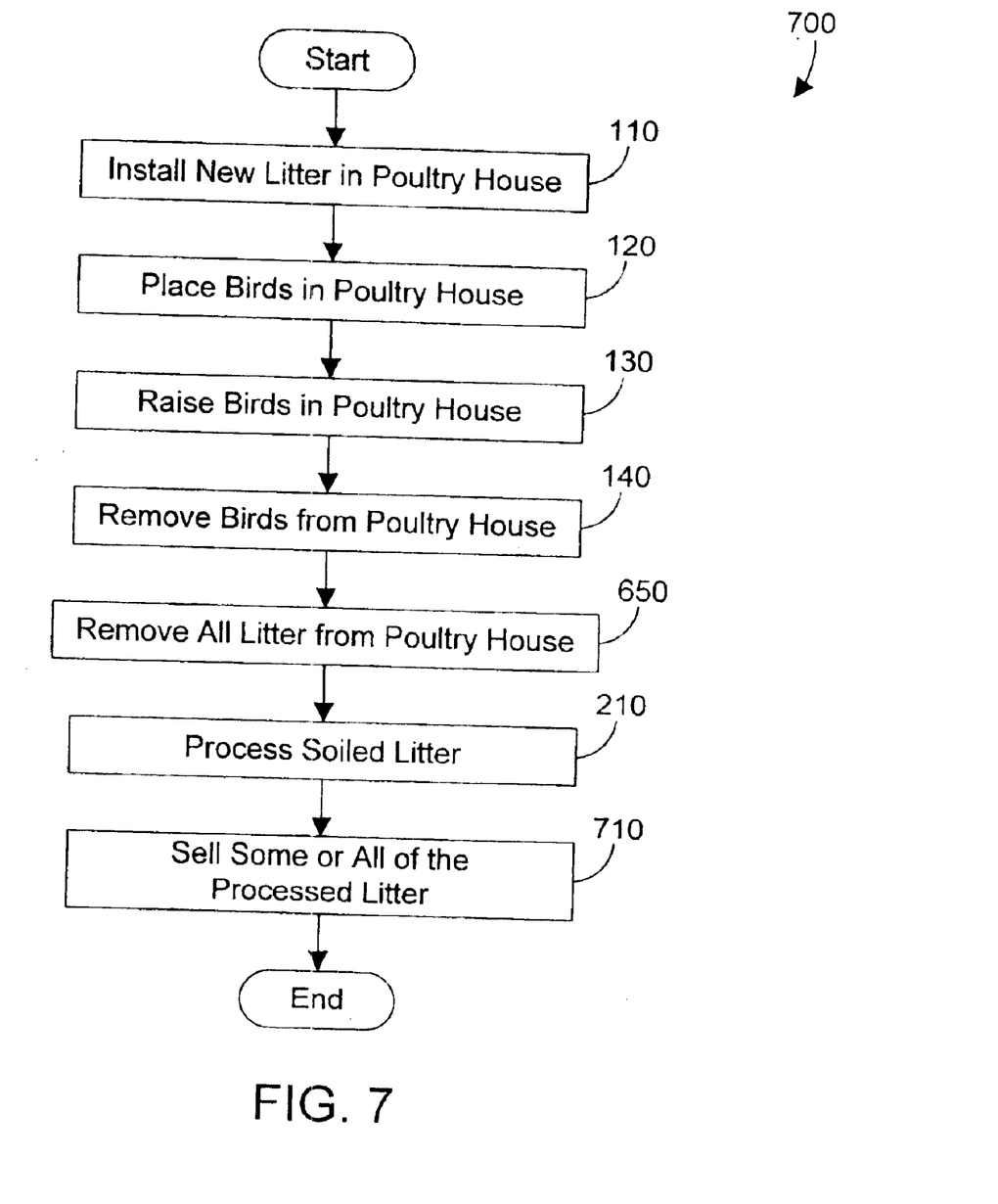
FIG. 7 is a flow diagram of a method for a poultry farmer to do business in accordance with the preferred embodiments.

Referring now to FIG. 7, a method 700 for doing business in accordance with the preferred embodiments includes steps 110, 120, 130, 140, 650, and 210 discussed above with reference to method 600 of FIG. 6. Step 710, however, is the step of selling some-or all of the processed litter. Instead of buying new litter, a poultry farmer could purchase processed litter, knowing that the processed litter contains fewer bacteria and insects than even new litter. As a result, method 700 for doing business provides additional opportunity for a poultry farmer to process and sell soiled litter to others, including sales of processed litter to greenhouses, gardeners, chain stores, etc.

Figure 8:
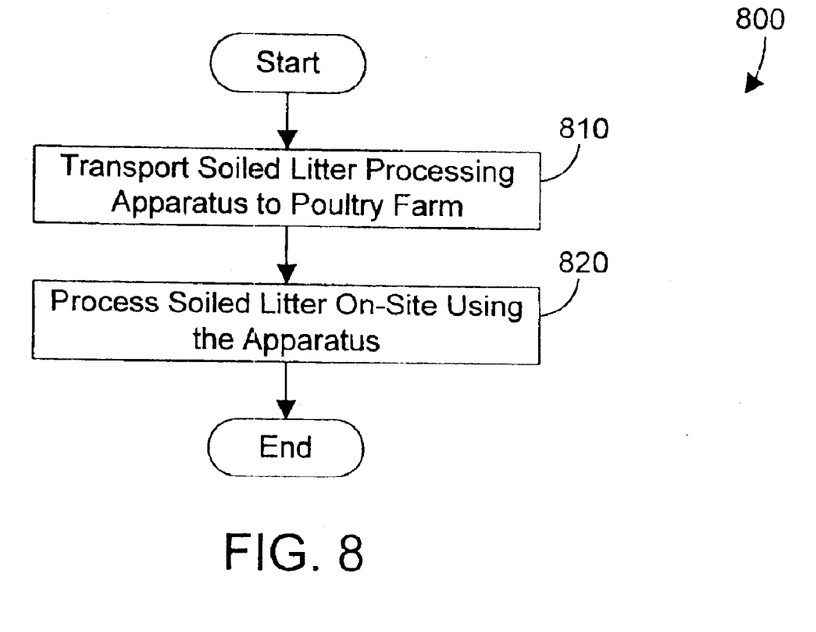
FIG. 8 is a flow diagram of a method for doing business of on-site processing of soiled litter in accordance with the preferred embodiments.

Another method for doing business that is within the scope of the preferred embodiments is shown as method 800 in FIG. 8. First, an apparatus that is used to process soiled litter is transported to a site, such as a poultry farm (step 810). The soiled litter at the poultry farm may then be processed on-site using the apparatus (step 820). This method 800 essentially provides a service of on-site processing of animal waste. Thus, if a poultry farmer wants to take advantage of on-site processing of soiled litter, the poultry farmer could contract with a person or company that does business in accordance with method 800 shown in FIG. 8. The preferred apparatus used in method 800 is a screw-type extruder. Note, however, that any suitable apparatus may be used in method 800 to process animal waste to kill bacteria and insects.

Figure 9:
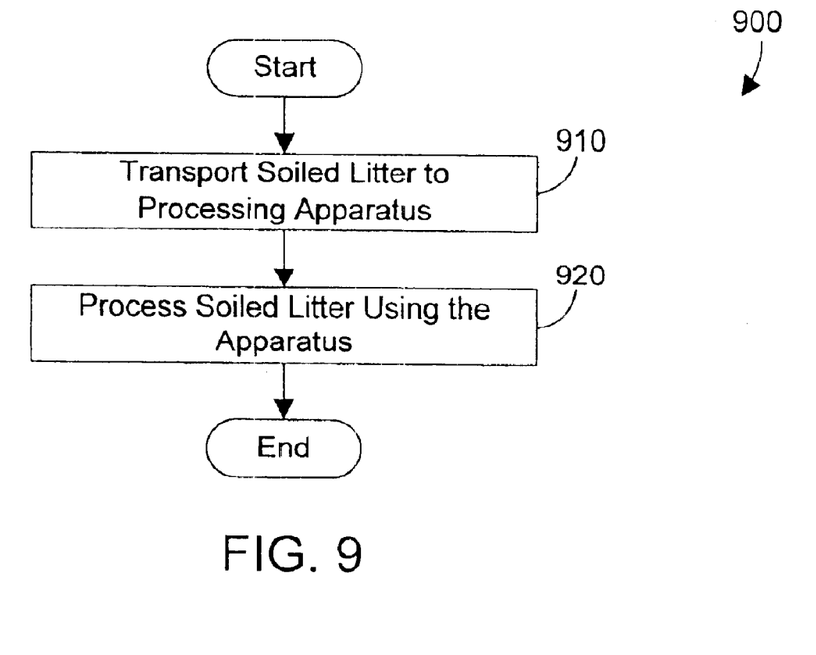
FIG. 9 is a flow diagram of a method for doing business of off-site processing of soiled litter in accordance with the preferred embodiments.

Yet another method for doing business that is within the scope of the preferred embodiments is shown as method 900 in FIG. 9. An apparatus for processing soiled litter is located at a processing facility. The soiled litter is transported to the apparatus (step 910). The soiled litter is then processed using the apparatus (step 920). This method 900 essentially provides a service of processing of animal waste. Thus, if a poultry farmer wants to take advantage of processing of soiled litter, the poultry farmer could contract with a person or company that does business in accordance with method 900 shown in FIG. 9 to haul and process the soiled litter. Once the soiled litter is processed, the processed litter may be sold or used for any suitable purpose, including litter and fertilizer.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the discussion in this patent application specifically addresses poultry farming, and hence the processing of soiled poultry litter, the preferred embodiments are not limited to poultry farming, but expressly extend to the processing of any animal waste that includes urine and/or feces.

I claim:

1. A method for poultry farm to do business comprising the steps of:
   (A) placing clean litter on the floor of a poultry house;
   (B) raising a first plurality of birds in the poultry house, during which the birds defecate on the litter, thereby soiling the litter;
   (C) removing the first plurality of birds from the poultry house;
   (D) removing substantially all of the soiled litter from the poultry house;
   (E) processing the soiled litter on-site at the poultry farm by compressing the soiled litter and heating the soiled litter to at least a predetermined temperature;
   (F) placing the processed litter on the floor of at least one poultry house on the poultry farm at a time when the processed litter is still warmer than the at least one poultry house; and
   (G) introducing at least a second plurality of birds into the at least one poultry house no later than two days after the processed litter has been placed therein and thereafter raising the second plurality of birds in the at least one poultry house.

2. The method of doing business of claim 1 wherein step (E) comprises the step of running the soiled litter through a screw-type extruder.

3. The method of doing business of claim 1 wherein the predetermined temperature is sufficient to kill bacteria and insects in the animal waste.

4. The method of doing business of claim 1 wherein the predetermined temperature is 132° C.

5. The method of doing business of claim 1 wherein the predetermined temperature is 145° C.

6. The method of doing business of claim 1 wherein the predetermined temperature is 160° C.

7. A method for poultry farm to do business comprising the steps of:
   (A) placing clean litter on the floor of a poultry house;
   (B) raising a first plurality of birds in the poultry house, during which the birds defecate on the litter, thereby soiling the litter;
   (C) removing the first plurality of birds from the poultry house;
   (D) removing substantially all of the soiled litter from the poultry house;
   (E) processing the soiled litter by heating the soiled litter to at least a predetermined temperature;
   (F) placing the processed litter on the floor of at least one poultry house; and
   (G) introducing at least a second plurality of birds in the at least one poultry house no later than two days after the processed litter has been placed therein and thereafter raising the second plurality of birds in the at least one poultry house.

8. The method of doing business of claim 7 wherein the step of processing the soiled litter further comprises the step of compressing the soiled litter.

9. The method of doing business of claim 8 wherein step (F) comprises the step of running the soiled litter through a screw-type extruder.

* * * * *